(12) United States Patent
Jung et al.

(10) Patent No.: US 9,629,143 B2
(45) Date of Patent: Apr. 18, 2017

(54) SYSTEMS, METHODS, AND DEVICES FOR ENHANCING SPECTRAL EFFICIENCY WITH NETWORK-ASSISTED ADVANCED RECEIVERS

(71) Applicant: Intel IP Corporation, Santa Clara, CA (US)

(72) Inventors: Hyejung Jung, Palatine, IL (US); Utsaw Kumar, Santa Clara, CA (US); PingPing Zong, Randolph, NJ (US)

(73) Assignee: INTEL IP CORPORATION, Santa Clara, CA (US)

( * ) Notice: Subject to any disclaimer, the term of this patent is extended or adjusted under 35 U.S.C. 154(b) by 56 days.

(21) Appl. No.: 14/499,178

(22) Filed: Sep. 28, 2014

(65) Prior Publication Data

US 2015/0195820 A1  Jul. 9, 2015

Related U.S. Application Data

(60) Provisional application No. 61/924,194, filed on Jan. 6, 2014.

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0073* (2013.01)

(58) Field of Classification Search
CPC ........................... H04L 5/0073; H04W 72/042
See application file for complete search history.

(56) References Cited

U.S. PATENT DOCUMENTS

| 2013/0044697 A1* | 2/2013 | Yoo | H04W 72/082 370/329 |
| 2013/0114517 A1* | 5/2013 | Blankenship | H04L 5/0053 370/329 |

(Continued)

FOREIGN PATENT DOCUMENTS

| WO | 2013025943 A1 | 2/2013 |
| WO | 2013066877 A1 | 5/2013 |
| WO | 2013066935 A1 | 5/2013 |

OTHER PUBLICATIONS

Alcatel-Lucent, et al., "Signalling of Network Assistance Information in NAICS", R1-135182, 3GPP TSG-RAN WG1 Meeting #75, San Francsisco, United States, Nov. 11-15, 2013, 3 pages.

(Continued)

*Primary Examiner* — Ayaz Sheikh
*Assistant Examiner* — Hai-Chang Hsiung
(74) *Attorney, Agent, or Firm* — Stoel Rives LLP (57) ABSTRACT

Systems and methods for enhancing spectral efficiency are disclosed herein. User equipment (UE) may be configured to communicatively couple to an Evolved Universal Terrestrial Radio Access Network (E-UTRAN) Node B (eNB). The UE may be configured to cancel interference from an interfering eNB. The interfering eNB may provide transmission parameters to the UE. The interfering eNB may transmit a compact message indicative of the transmission parameters to the UE. The compact message may be a broadcast message. Some transmission parameters may be sent to the UE using higher layer signaling. The UE may be able to use the transmission parameters to cancel interference from the interfering eNB. In some embodiments, the interfering and/or serving eNB may indicate to the UE whether the transmission parameters are being broadcast so the UE does not search for them unnecessarily.

9 Claims, 6 Drawing Sheets

(56) References Cited

U.S. PATENT DOCUMENTS

| | | | | |
|---|---|---|---|---|
| 2014/0126403 A1* | 5/2014 | Siomina | ............... | H04W 24/10 370/252 |
| 2014/0233466 A1* | 8/2014 | Pourahmadi | .......... | H04L 5/0051 370/329 |
| 2014/0243002 A1* | 8/2014 | Muruganathan | .. | H04W 72/0426 455/450 |

OTHER PUBLICATIONS

Huawei, et al., "Discussion on network coordination/signaling and specification impact for advanced receivers", R1-135017, 3GPP TSG RAN WGI Meeting #75, San Franciscisco, USA, Nov. 11-15, 2013, 6 pages.

Panasonic, "Signalling mechanisms for interference information", R1-134380, 3GPP TSG RAN WG1 Meeting #74bis, Guangzhou, China, Oct. 7-11, 2013, 3 pages.

PCT/US2015/010374, International Search Report and Written Opinion, Mar. 31, 2015, 13 pages.

* cited by examiner

| Network Assistance Signaling ||||||||||||||||||||| 
| P_A ||| VRB | Transmission Scheme || Modulation Order ||||||| Transmission Layers ||| RS Parameters |||| Gap |
| a0 | a1 | a2 | a3 | a4 | a5 | a6 | a7 | a8 | a9 | a10 | a11 | a12 | a13 | a14 | a15 | a16 | a17 | a18 | a19 | a20 |

SYSTEMS, METHODS, AND DEVICES FOR ENHANCING SPECTRAL EFFICIENCY WITH NETWORK-ASSISTED ADVANCED RECEIVERS

RELATED APPLICATIONS

This application claims priority to and the benefit of U.S. Provisional Patent Application No. 61/924,194, filed Jan. 6, 2014, which is hereby incorporated by reference herein in its entirety.

TECHNICAL FIELD

The present disclosure relates to systems, methods, and devices for enhancing spectral efficiency in wireless networks.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet.

LTE networks include radio access technology and core radio network architecture that provide high data rate, low latency, packet optimization, and improved system capacity and coverage. In LTE networks, eNBs may have overlapping coverage areas. For example, a UE near a cell edge of a first eNB (e.g., a first macro cell) to which it is coupled and thus may receive interference from a second eNB (e.g., a second macro cell) and/or from other UEs coupled to the second eNB. In another example, a first eNB that is a small cell (e.g., a micro cell, a pico cell, a femto cell, etc.) may be partially or wholly within the coverage area of a second eNB that is a macro cell. There may be substantial interference between the small cell and the macro cell in commonly used time-frequency resource blocks. To mitigate the interference almost blank subframes (ABS) may be utilized by the macro cell when a UE is in communication with the small cell.

In some instances, geometry and/or throughput of UEs and/or eNBs may be improved by coupling UEs to small cells rather than macro cells. A UE may support cell range expansion (CRE) mode and may couple to a small cell even though a better signal is being received from a macro cell. The UE may have a handover bias greater than nine decibel (dB) for the small cell versus the large cell. However, CRE UEs may have a very low geometry (e.g., a low signal-to-interference-plus-noise ratio (SINR)) and thus may be restricted to only being scheduled on ABS. Accordingly, the gains from CRE may be offset and/or entirely negated by the higher ABS rate, particularly for high throughput UEs. In some instances, performance may even be degraded. Thus, there is a need for overlapping cells to more efficiently use available spectrum, particularly when UEs are in CRE mode.

The ABS rate may be reduced and/or eliminated if the UE is able to use interference cancellation (IC) to remove interference from neighboring eNBs and/or other UEs. A macro cell and a small cell with overlapping coverage areas may use the same time-frequency resources even while communicating with UEs employing a large CRE bias. In fact, a large CRE bias may be beneficial by increasing small-cell attach rate (and accordingly, potentially providing a higher traffic offloading gain) as well as improving interference cancellation due to the strong interference signal received from the interfering eNB (e.g., the macro eNB). Accordingly, the spectral efficiency of the macro eNB as well as the small eNB may be improved by supporting IC.

In some embodiments, a UE may include a Physical Downlink Shared Channel (PDSCH) IC receiver but strong interference may remain on a control region of subframes (e.g., a Physical Downlink Control Channel (PDCCH)). It may be difficult for the UE to decode the PDSCH without the control information and without using ABS. In an embodiment, this issue may be resolved by including an advanced PDCCH receiver capable of handling the strong PDCCH interference in the UE. Alternatively, or in addition, cross-subframe scheduling may be employed. Some ABS may remain to support legacy UEs without a PDSCH-IC receiver. Accordingly, the ABS may be used to transmit downlink scheduling information for PDSCH intended for the UE (e.g., PDSCH transmitted on non-ABS).

For a UE to utilize IC, transmission parameters specific to each interfering PDSCH and cell-specific parameters for each interfering eNB may need to be signaled from an interfering eNB (e.g., a macro eNB) or from a serving eNB to the UE (e.g., to a CRE UE). Because some eNBs may be coupled to other eNBs with non-ideal backhaul, centralized scheduling and/or exchange of scheduling and/or channel state information may not always occur. Accordingly, the interfering eNB may dynamically provide scheduling information for each interfering subframe, for example, by broadcasting a message including the scheduling information (e.g., via the PDSCH). To conserve resources, the scheduling information may be transmitted in a compact and/or compressed format. Furthermore, additional parameters may be transmitted using dedicated higher-layer assistance signaling (e.g., via Radio Resource Control (RRC) messages). For example, the additional parameters may be transmitted semi-statically by the serving eNB (e.g., the small eNB) using higher layer signaling defined by LTE release 11 in relation to further enhanced inter-cell interference coordination (FeICIC). Alternatively, the serving eNB may signal the transmission parameters related to one or more interfering PDSCHs, such as when the serving eNB is connected to the interfering eNB via a low latency backhaul and/or when the transmission parameters for the one or more interfering PDSCHs do not change for a certain time period (e.g., a predetermined time period).

The transmission parameters may include parameters specific to each interfering PDSCH. The parameters related to PDSCH transmission may be indicated to an intended UE via dynamic signaling and/or semi-static higher layer signaling. For example, dynamic parameters indicated by dynamic signaling may include a physical resource block (PRB) allocation, a precoding matrix indicator (PMI), a rank indicator (RI), a modulation and coding scheme (MCS), a redundancy version, and/or the like. Semi-static parameters indicated by semi-static higher layer signaling may include a transmission mode (TM), a UE specific power parameter (e.g., $P_A$ in 3GPP TS 36.213 v. 12.2), and/or the like. PDSCH codewords may be scrambled by a scrambling sequence, and an initialization value of the sequence generator may depend on a cell identity (cell ID) and a radio network temporary identifier (RNTI). For channel estimation based on UE-specific reference signal (RS), the cell ID and RNTI may be needed for antenna port 5, and a scrambling ID (SCID), $n_{ID}^{DMRS,i}$ (a virtual cell ID that may be sent via higher layer signaling where DMRS stands for demodulation reference signal), and $n_{SCID}$ (a DMRS port that may be sent via dynamic signaling) may be needed for antenna ports 7-14.

The transmission parameters specific to each interfering cell may include parameters provided through FeICIC network assistance signaling for enabling cell specific RS (CRS) IC and/or physical broadcast channel (PBCH) IC, such as cell ID, number of CRS ports, multicast-broadcast single-frequency network (MBSFN) subframe configuration, and/or the like. A control format indicator (CFI) in a physical control format indicator channel (PCFICH) for an interfering cell may be detected by using the signaled cell ID and number of antenna ports, which may also be obtained from decoding of the interfering cell's PBCH. (The PCFICH may be transmitted on the same set of antenna ports as the PBCH). Additional information about the various transmission parameters discussed herein may be found in the specifications 3GPP TS 36.211, v. 12.2 and 3GPP TS 36.312, v. 12.2 and earlier versions of each.

In an embodiment, the UE may decode the PDCCH associated with an interfering PDSCH to obtain transmission parameters for the interfering PDSCH. However, this may require decoding over all possible RNTI values. Thus, blind decoding of the PDCCH, which may carry scheduling information for the interfering PDSCH, may not be practically feasible and/or may be resource intensive (e.g., consume significant power from the UE). Moreover, even after successfully decoding the PDCCH, some transmission parameters (e.g., a precoder determined according to the latest reported PMI) may not be obtainable from the downlink control information (DCI). However, in an embodiment with a large CRE bias, the macro cell attach ratio may drop significantly (e.g., from 46% for no CRE to 17.4% for 18 dB CRE bias in an instance), and the geometry of the macro-UE may improve. Thus, some radio resources of the macro eNB may be used for transmitting assistance signaling for PDSCH-IC without a noticeable loss in performance for UEs coupled to the macro eNB. Dynamic assistance signaling may be applied to any inter-cell interference scenario with IC receivers.

A reduced set of transmission parameters may be provided to the UE as dynamic assistance signaling, and both dynamic and semi-static parameters may be included in dynamic assistance signaling. Parameters sent via higher layer assistance signaling may not need to be included. In addition, transmission parameters that are included may be sent in a compact and/or compressed format. The reduced set of transmission parameters may be transmitted from the interfering eNB to the UE. For example, a PDSCH carrying a broadcast message with the transmission parameters may be scrambled with an interference cancelation-RNTI (IC-RNTI), which may be a fixed value. For the UE to perform codeword-level interference cancellation (e.g., using a turbo receiver), signaling of the interfering PDSCH's RNTI (e.g., a size of 16 bits) may be required, which may increase signaling overhead significantly. Accordingly, signaling overhead may be reduced by omitting the RNTI of the interfering PDSCH and assuming the UE will perform symbol level IC instead. In alternate embodiments, the RNTI may be included in the signaling.

In an embodiment, the dynamic assistance signaling may include a 20 bit per PRB signal for systems with a downlink (DL) bandwidth of less than 50 resource blocks (RB) and may include a signal including 21 bits per PRB signal for DL bandwidths greater than or equal to 50 RB. The parameters may correspond to a PRB in the first slot of each subframe, and transmission parameters for PRBs in the second slot may be implicitly determined from the transmission parameters for the PRBs in the first slot of the corresponding subframe rather than being explicitly signaled.

For example, a first three bits ($a_0$, $a_1$, $a_2$) of the signal may include a UE specific power parameter $P_A$. The eight possible values for $P_A$ may be [−6, −4.77, −3, −1.77, 0, 1, 2, 3] dB in an embodiment. The fourth bit ($a_3$) may indicate whether virtual resource block (VRB) assignments are localized or distributed. If the VRB assignment is localized, transmission parameters for each PRB in the first slot may be applied to the corresponding PRB pair. The fifth and sixth bits ($a_4$, $a_5$) may indicate a transmission scheme. In an embodiment, if there is one PBCH antenna port and the transmission scheme is not indicated as being UE-specific RS based transmission, a single-antenna port transmission scheme using port 0 may be assumed. An embodiment of a mapping from bit values to transmission scheme is included in Table 1:

TABLE 1

| Bit Values | Transmission Scheme |
| --- | --- |
| 0 | Transmit diversity |
| 1 | Large delay-cyclic delay diversity (LD-CDD) |
| 2 | Closed-loop spatial multiplexing |
| 3 | UE-Specific RS based transmission |

The seventh through thirteenth bits ($a_6$, $a_7$, ... $a_{12}$) may indicate a modulation order and/or number of codewords (CWs). For example, there may be 120 different possible modulation order and number of codeword combinations in an embodiment (e.g., 81 cases for four codewords, 27 cases for three codewords, nine cases for two codewords, and three cases for one codeword). Thus, seven bits may be a compact, low entropy encoding of the different possibilities. An embodiment of a mapping from bit values to modulation order and number of codewords is included in Table 2:

TABLE 2

| Bit Values | Modulation Order and Number of Codewords |
|---|---|
| 0 | QPSK (1 CW) |
| 1 | QPSK, QPSK (2 CWs) |
| 2 | QPSK, QPSK, QPSK, QPSK (4 CWs) |
| 3 | QPSK, QPSK, QPSK (3 CWs) |
| 4 | QPSK, QPSK, QPSK, 64QAM |
| 5 | QPSK, QPSK, 16QAM, 64QAM |
| 6 | QPSK, QPSK, QPSK, 16QAM |
| 7 | QPSK, QPSK, 16QAM, 16QAM |
| ... | ... |
| 120 | Reserved |
| ... | |
| 127 | |

The fourteenth through sixteenth bits ($a_1$, $a_{14}$, $a_{15}$) may indicate a number of total transmission layers, including for multiuser multiple-input multiple-output (MU-MIMO) configurations. For UE-specific RS based transmission, there may be up to eight layers. For CRS based transmission, there may be up to four layers. The antenna ports used for transmission of PDSCH may be the same as the set of antenna ports for PBCH. Because the transmission scheme (and which RS based transmission scheme it is, e.g., UE-specific RS based or CRS based) may be identifiable from other elements of the assistance signaling, only three bits may be needed. For CRS based transmission, the fourteenth bit ($a_{13}$) may be reserved.

The seventeenth through twentieth bits ($a_{16}$, $a_{17}$, $a_{18}$, $a_{19}$) may have different meanings depending on whether UE-specific RS based transmission or CRS based transmission is being used. For UE-specific RS based transmission, the seventeenth through nineteenth bits ($a_{16}$, $a_{17}$, $a_{18}$) may indicate the scrambling ID (e.g., the virtual cell ID), $n_{ID}^{DMRS,i}$, and the twentieth bit ($a_{19}$) may distinguish between two possible cases for a given number of total transmission layers and codewords. In an embodiment, it may be assumed that whether port 7 or 8 is being used may be blindly estimated. An embodiment of various cases for UE-specific RS based transmissions is included in Table 3:

TABLE 3

| Number of Codewords | Total Transmission Layers | Description | Number of Cases |
|---|---|---|---|
| 1 | 1 | Port 7 or 8, $n_{SCID}$ = 0 or 1 | 2 |
| | 2 | Port 7 or 8, $n_{SCID}$ = 0 | 1 |
| | 3 | Port 7-9, $n_{SCID}$ = 0 | 1 |
| | 4 | Port 7-10, $n_{SCID}$ = 0 | 1 |
| 2 | 2 | 1 or 2 users: 1 CW and 1 layer for Ports 7 and 8 respectively, $n_{SCID}$ = 0 or 1 | 2 |
| | 3 | 1 user: 2 CWs, 3 layers, Ports 7-9, $n_{SCID}$ = 0<br>2 users: (1 CW, 2 layers, Ports 7 or 8, $n_{SCID}$ = 0) + (1 CW, 1 layer, Port 7 or 8, $n_{SCID}$ = 1) | 2 |
| | 4 | 1 user: 2 CWs, 4 layers, Ports 7-10, $n_{SCID}$ = 0<br>2 users: (1 CW, 3 layers, Ports 7-9, $n_{SCID}$ = 0) + (1 CW, 1 layer, Port 7 or 8, $n_{SCID}$ = 1) | 2 |
| | 5 | 1 user: 2 CWs, 5 layers, Ports 7-11, $n_{SCID}$ = 0<br>2 users: (1 CW, 4 layers, Ports 7-10, $n_{SCID}$ = 0) + (1 CW, 1 layer, Port 7 or 8, $n_{SCID}$ = 1) | 2 |
| | 6/7/8 | 1 user: 2 CWs, 6/7/8 layers, Ports 7-12/7-13/7-14, $n_{SCID}$ = 0 | 1 |
| 3 | 3 | 2 or 3 users:<br>(1 CW and 1 layer for Ports 7 and 8 respectively, $n_{SCID}$ = 0) + (1 CW, 1 layer, Port 7 or 8, $n_{SCID}$ = 1)<br>(1 CW and 1 layer for Ports 7 and 8 respectively, $n_{SCID}$ = 1) + (1 CW, 1 layer, Port 7 or 8, $n_{SCID}$ = 0) | 2 |
| | 4 | 2 or 3 users:<br>(1 CW, 2 layers, Port 7 or 8, $n_{SCID}$ = 0) + (1 CW and 1 layer for Ports 7 and 8, respectively, $n_{SCID}$ = 1)<br>(2 CW, 3 layers, Ports 7-9, $n_{SCID}$ = 0) + (1 CW, 1 layer, Port 7 or 8, $n_{SCID}$ = 1) | 2 |
| | 5 | 2 or 3 users:<br>(1 CW, 3 layers, Ports 7-9, $n_{SCID}$ = 0) + (1 CW and 1 layer for Ports 7 and 8, respectively, $n_{SCID}$ = 1)<br>(2 CW, 4 layers, Ports 7-10, $n_{SCID}$ = 0) + (1 CW, 1 layer, Port 7 or 8, $n_{SCID}$ = 1) | 2 |
| | 6 | 2 or 3 users:<br>(1 CW, 4 layers, Ports 7-10, $n_{SCID}$ = 0) + (1 CW and 1 layer for Ports 7 and 8, respectively, $n_{SCID}$ = 1)<br>(2 CW, 5 layers, Ports 7-11, $n_{SCID}$ = 0) + (1 CW, 1 layer, Port 7 or 8, $n_{SCID}$ = 1) | 2 |
| | 7/8 | 2 users:<br>(2 CWs, 6/7 layers, Ports 7-11/7-12, $n_{SCID}$ = 0) + (1 CW, 1 layer, Port 7 or 8, $n_{SCID}$ = 1) | 1 |
| 4 | 4 | 2, 3, or 4 users:<br>(1 CW and 1 layer for Ports 7 and 8, respectively $n_{SCID}$ = 0) + (1 CW and 1 layer for Ports 7 and 8, respectively, $n_{SCID}$ = 1) | 1 |
| | 5 | 2 or 3 users:<br>(2 CWs, 3 layers, Ports 7-9, $n_{SCID}$ = 0) + (1 CW and 1 layer for Ports 7 and 8, respectively, $n_{SCID}$ = 1) | 1 |

TABLE 3-continued

| Number of Codewords | Total Transmission Layers | Description | Number of Cases |
|---|---|---|---|
| | 6/7/8 | 2 or 3 users:<br>(2 CWs, 4/5/6 layers, Ports 7-10/7-11/7-12, $n_{SCID}$ = 0) +<br>(1 CW and 1 layer for Ports 7 and 8, respectively,<br>$n_{SCID}$ = 1) | 1 |

For CRS based transmission, the seventeenth through twentieth bits ($a_{16}$, $a_{17}$, $a_{18}$, $a_{19}$) may indicate precoders. There may be up to 16 precoders on antenna ports {0, 1} or {0, 1, 2, 3}.

The twenty-first bit ($a_{20}$) may indicate a RB gap value for distributed VRB assignment. This element may only be present if the system bandwidth is 50 PRBs or larger. When the VRB assignment is distributed, a value of zero may indicate that $N_{gap}=N_{gap,1}$, and a value of one may indicate that $N_{gap}=N_{gap,2}$. When the VRB assignment is localized, this element may be reserved. Various other orders and/or combinations of bits and/or various other mappings may be used in other embodiments.

Additional parameters may be provided to the UE by the serving eNB. The serving eNB may use higher layer signaling (e.g., an RRC message) to transmit the additional parameters. For example, the serving eNB may transmit a cell specific power parameter $P_B$ via higher layer signaling. The serving cell may also, or instead, transmit a set of candidate cell IDs for $n_{ID}^{DMRS,i}$, which may be a smaller set of cell IDs (e.g., eight cell IDs and/or the like) related to transmission and/or reception points of potential cooperation.

Significant gains may be achieved from a large CRE bias and PDSCH-IC when the system is heavily loaded and/or when the small-cell attach rate without CRE is low. Time-domain resource sharing between macro eNBs and small eNBs with a small to moderate handover bias (e.g., ~0-6 dB) may be good enough to serve traffic in a lightly loaded system. Accordingly, unnecessary UE power consumption from monitoring assistance signaling and performing IC may be avoided by using ABS and indicating to the UE that assistance signaling is not being transmitted. A CRE UE may be required to decode the PBCH of the interfering eNB to perform PBCH-IC. In an embodiment, a master information block (MIB) transmitted in the PBCH may have 10 spare bits. Accordingly one bit may be used as an indicator informing the CRE UE whether or not monitor and decode PDCCH and/or PDSCH scrambled by IC-RNTI (e.g., whether a broadcast assistance message is being transmitted). A CRE UE may receive the PBCH from the interfering eNB with much higher power than the PBCH from the serving eNB. However, for homogeneous networks, it may be more reliable to carry the indicator bit on the serving eNB's MIB and/or system information block (SIB). For the serving eNB to do so, the interfering eNB may need to inform the serving eNB of whether or not to transmit the dynamic assistance signaling semi-statically via an X2 interface.

The overhead of dynamic network assistance signaling may be further reduced by restricting the potential resources allocated to CRE UEs to a limited set of subbands in the frequency domain, on some subframes. For example, for a DL system bandwidth of 100 RB. 2100 bits may need to be transmitted to the CRE UEs if the CRE UEs are allowed to be scheduled over the entire bandwidth. The size of assistance information may increase linearly with the number of schedulable PRBs, so signaling overhead may be greatly reduced by limiting the frequency resources on which the CRE UEs can be scheduled. Frequency-selective scheduling may still be achievable by selecting subbands distributed over the entire bandwidth. Inter-subframe frequency hopping and/or staggering for selected subbands may further help to exploit channel diversity.

In addition, applying frequency-domain restriction to the allocation of resources to the CRE UEs may protect macro UEs. While the CRE UE may perform IC at the receiver, the macro UEs may not cancel interference from small cell eNBs. Moreover, higher transmission power may be required from the small eNB for communicating with CRE UEs versus non-CRE UEs. Thus, it may be beneficial to schedule low geometry macro UEs on subbands that are not used by CRE UEs as much as possible. The macro eNB may determine frequency domain scheduling restrictions for the CRE UEs based on the load information from small eNBs and its own system load. The eNB may signal its decisions to the small cell eNBs via the X2 interface. In an embodiment, the scheduling restriction in the frequency domain may be applied only to CRE UEs. Non-CRE UEs coupled with the small eNB may be scheduled to any subband, so full frequency reuse between the macro eNB and the small eNB may still be achievable.

Figure 1:
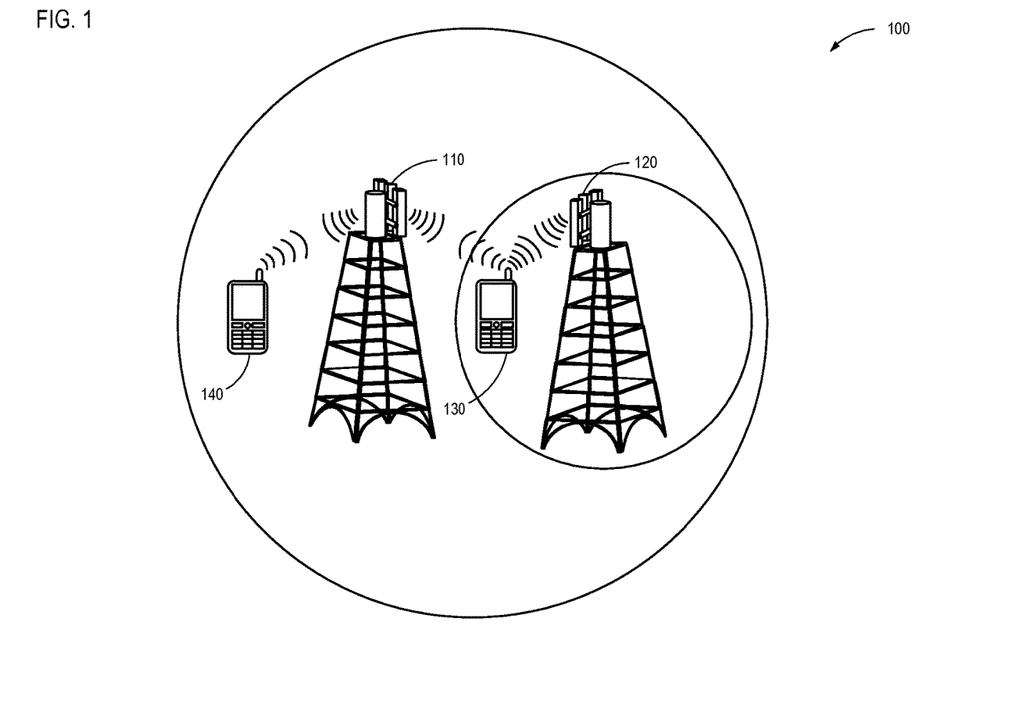
FIG. 1 is a schematic diagram of a system comprising a UE coupled to a small eNB within the coverage area of a macro eNB.

FIG. 1 is a schematic diagram of a system 100 comprising a UE 130 coupled to a small eNB 120 within the coverage area of a macro eNB 110. The UE 130 may be in a CRE mode so may be coupled with the small eNB 120 despite receiving a strong signal from the macro eNB 110. The UE 130 may receive interference from the macro eNB 110 and/or another UE 140 coupled to the macro eNB 110. To avoid the use of ABS, the UE 130 may be required to cancel PDSCH interference from the macro eNB 110. The UE 130 may need to know transmission parameters for it to cancel the interference from the macro eNB 110, so the macro eNB 110 may broadcast one or more messages comprising transmission parameters for PDSCH PRBs that interfere with the UE 130. The UE 130 may use the transmission parameters to decode PDSCH from the macro eNB 110, cancel it from a received signal, and decode PDSCH from the small eNB 120. In an embodiment, the UE 130 may use symbol-level IC to cancel the interference from the macro eNB 110.

Figure 2:
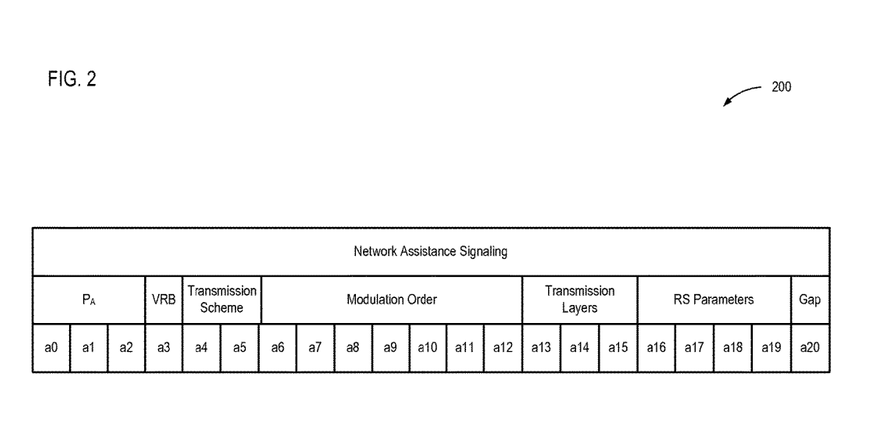
FIG. 2 is a bitmap relating bits in a dynamic assistance signaling message to transmission parameters necessary for a UE to perform IC.

FIG. 2 is a bitmap 200 relating bits in a dynamic assistance signaling message to transmission parameters necessary for a UE to perform IC. The dynamic assistance signaling may indicate transmission parameters for a PDSCH used for communications between an interfering eNB and an interfering UE. The first three bits may indicate a value for a UE specific power parameter PA. Each value for the three bits may correspond to a predefined and/or predetermined power level. A fourth bit may indicate whether VRB assignments are localized or distributed. Fifth and sixth bits may indicate a transmission scheme that may be employed for communications between the interfering eNB and the interfering UE. Seventh through thirteenth bits may indicate a number of codewords and the modulation scheme employed for each of those codewords. Fourteenth through sixteenth bits may indicate a number of transmission layers. Seventeenth through twentieth bits may indicate UE-specific RS based transmission parameters or CRS based transmission parameters depending on whether previous bits indicated that UE-specific RS based transmission or CRS based transmission was being used. A final twenty-first bit may be included when a system bandwidth is at least 50 RBs. The twenty-first bit may indicate an RB gap value.

For some and/or all of the previously discussed transmission parameters, the value of the element representing that parameter may be selected to be a compressed and/or compact representation of the transmission parameters. In an embodiment, the minimum number of bits necessary to represent all possible configurations of a transmission parameter may be used (e.g., a ceiling of a logarithm base 2 of all possible configurations for that transmission parameter). The UE may be able to use the bit values communicated to it to determine transmission parameters for one or more PDSCH interfering with the UE. Some parameters may also or instead be provided to the UE through higher layer signaling. The UE may be able to decode and cancel interference on the PDSCH using the received transmission parameters.

Figure 3:
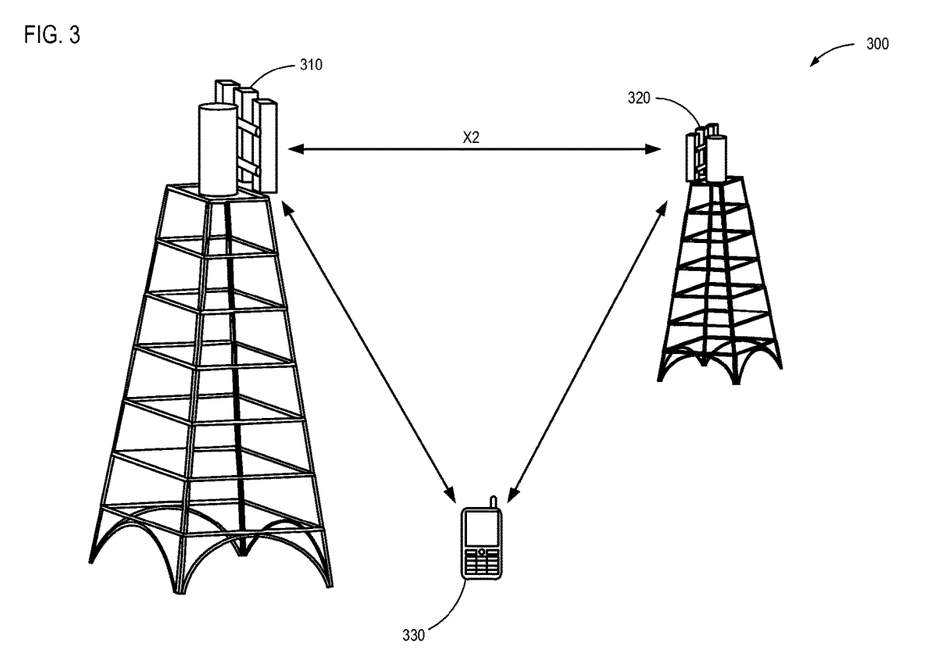
FIG. 3 is a schematic diagram of a system that includes a UE communicatively coupled with a serving eNB and receiving a strong signal from an interfering eNB.

FIG. 3 is a schematic diagram of a system 300 that includes a UE 330 communicatively coupled with a serving eNB 320 and receiving a strong signal from an interfering eNB 310. The interfering eNB 310 may be communicatively coupled to the serving eNB 320 via an X2 interface. The interfering eNB 310 may be able to transmit parameters for IC to the UE 330. The interfering eNB 310 may be able to disable dynamic network assistance signaling if requiring the UE 330 to perform IC provides little or no benefit over using ABS. The interfering eNB 310 may indicate to the UE 330 whether the interfering eNB 310 is broadcasting parameters for IC. For example, the interfering eNB 310 may transmit a PBCH comprising a MIB or a PDSCH comprising a SIB that includes a bit indicating whether parameters for IC are being broadcast. In some instances, such as when the interfering and serving eNBs 310, 320 are both macro cells, it may be more efficient for the serving eNB 320 to transmit the indication of whether dynamic network assistance signaling is enabled. Accordingly, the interfering eNB 310 may indicate to the serving eNB 320 via the X2 interface whether the dynamic network assistance signaling is enabled, and the serving eNB 320 may inform the UE 330 of whether the dynamic network assistance scheduling is enabled (e.g., using a MIB, a SIB, and/or the like).

To reduce assistance signaling between the interfering eNB 310 and the UE 330, the UE 330 may be restricted to only being scheduled on a portion smaller than the whole of all available subbands. The interfering eNB 310 may determine to which subbands the UE 330 should be restricted. The interfering eNB 310 may indicate which subbands were selected to the serving eNB 320. The serving eNB 320 may provide scheduling information to the UE 330, and the scheduling information may comply with the restrictions selected by the interfering eNB 310. The interfering eNB 310 may be configured to select the subbands so that they are distributed throughout the entire available bandwidth. In addition, the serving eNB 320 may schedule the UE 330 with inter-frame frequency hopping and/or staggering for the selected subbands to exploit channel frequency diversity.

Figure 4:
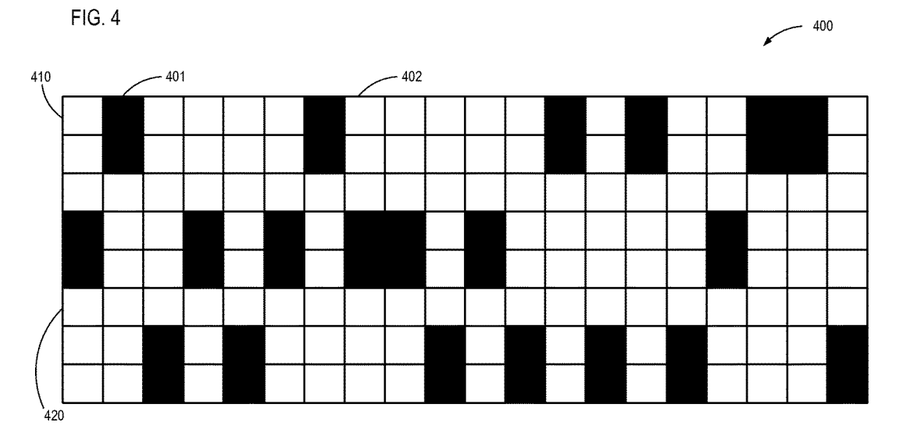
FIG. 4 is a schematic diagram of time-frequency radio resources which may be used by a UE to communicate with an eNB.

FIG. 4 is a schematic diagram of time-frequency radio resources 400 which may be used by a UE to communicate with an eNB. The time-frequency radio resources 400 have been simplified relative to many embodiments for illustrative purposes. The time-frequency radio resources 400 may include a plurality of time-frequency resource blocks 401, 402, which may be available to be allocated for communication between the UE and the eNB. In the illustrated embodiment, resource blocks allocated to the UE are black (e.g., the resource block 401) and resource blocks unavailable to the UE are white (e.g., the resource block 402).

The frequency component of the time-frequency radio resources 400 may be divided into a plurality of subbands 410, 420. The UE may only be allocated time-frequency resources in some subbands (e.g., the subband 410) and may be restricted from being allocated time-frequency resources on other subbands (e.g., the subband 420). Despite the subband restriction, the time-frequency resource blocks 401 allocated to the UE may be distributed throughout the frequency spectrum, and the UE may receive the benefit of the spectral diversity available for the time-frequency spectrum 400. In the illustrated embodiment, the subbands 410 are evenly distributed, but they may be unevenly distributed while still being distributed throughout the entire available frequency spectrum in other embodiments.

Figure 5:
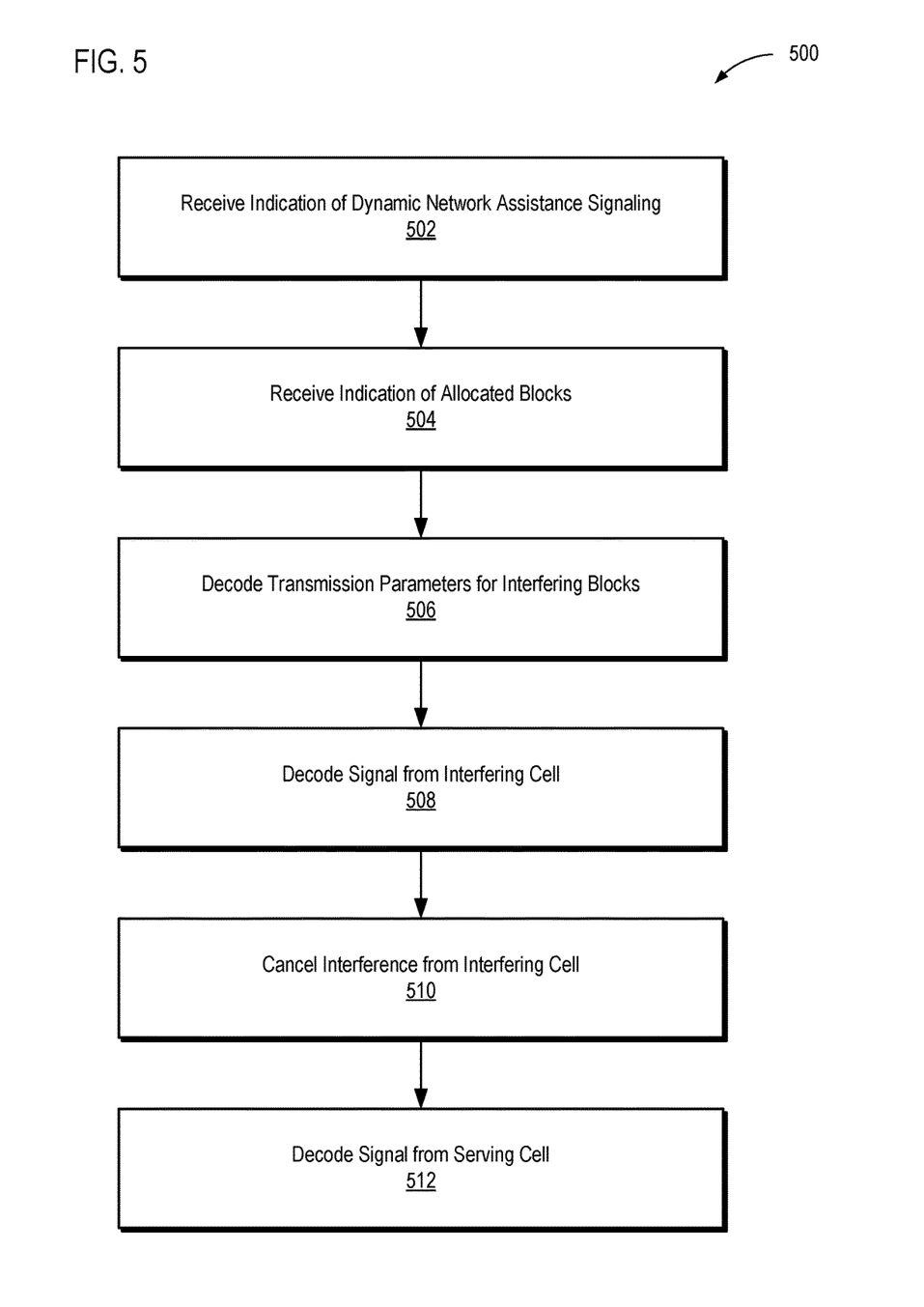
FIG. 5 is a flow diagram of a method for receiving network assistance signaling for performing IC.

FIG. 5 is a flow diagram of a method 500 for receiving network assistance signaling for performing IC. The method 500 may begin with receiving 502 an indication of whether dynamic network assistance signaling is active. The indication may be received from an interfering eNB and/or may be received from a serving eNB. The indication may be included in a PBCH, such as in a MIB and/or SIB transmitted in a PDSCH. In some embodiments, the indication may be a single bit with a first value indicating that network assistance signaling is being transmitted and a second value indicating that network assistance signaling is not being transmitted. If network assistance signaling is not being transmitted, the method 500 may end and/or receiving 502 the indication may be repeated until assistance signaling is being transmitted.

An indication of allocated time-frequency blocks may be received 504, for example, from the serving eNB. The allocated time-frequency blocks may be restricted to a predetermined set of subbands to reduce the size of assistance signaling and/or reduce interference. A broadcast message including indications of the transmission parameters may be received. The broadcast message may be decoded 506 to determine the transmission parameters for interfering blocks. The transmission parameters may include UE-specific transmission parameters and/or cell specific parameters for time-frequency blocks that may interfere with the allocated blocks. Some transmission parameters may be sent via higher layer signaling.

The transmission parameters may allow a signal from the interfering eNB to be decoded 508. In some embodiments, the signal may be demodulated to a symbol level, but error correction (e.g., using a turbo receiver) may not be applied. Alternatively, the signal may be decoded to a codeword level, including performing error correction (e.g., using a turbo receiver). Interference from the interfering eNB may be canceled 510 from a signal received from the serving eNB. The interference may be canceled 510 by modulating the decoded symbols and/or codewords, applying an estimated channel response, and subtracting the result from the signal. The signal from the serving cell with the interference canceled may be decoded 512 to obtain the contents of the signal from the serving cell.

Figure 6:
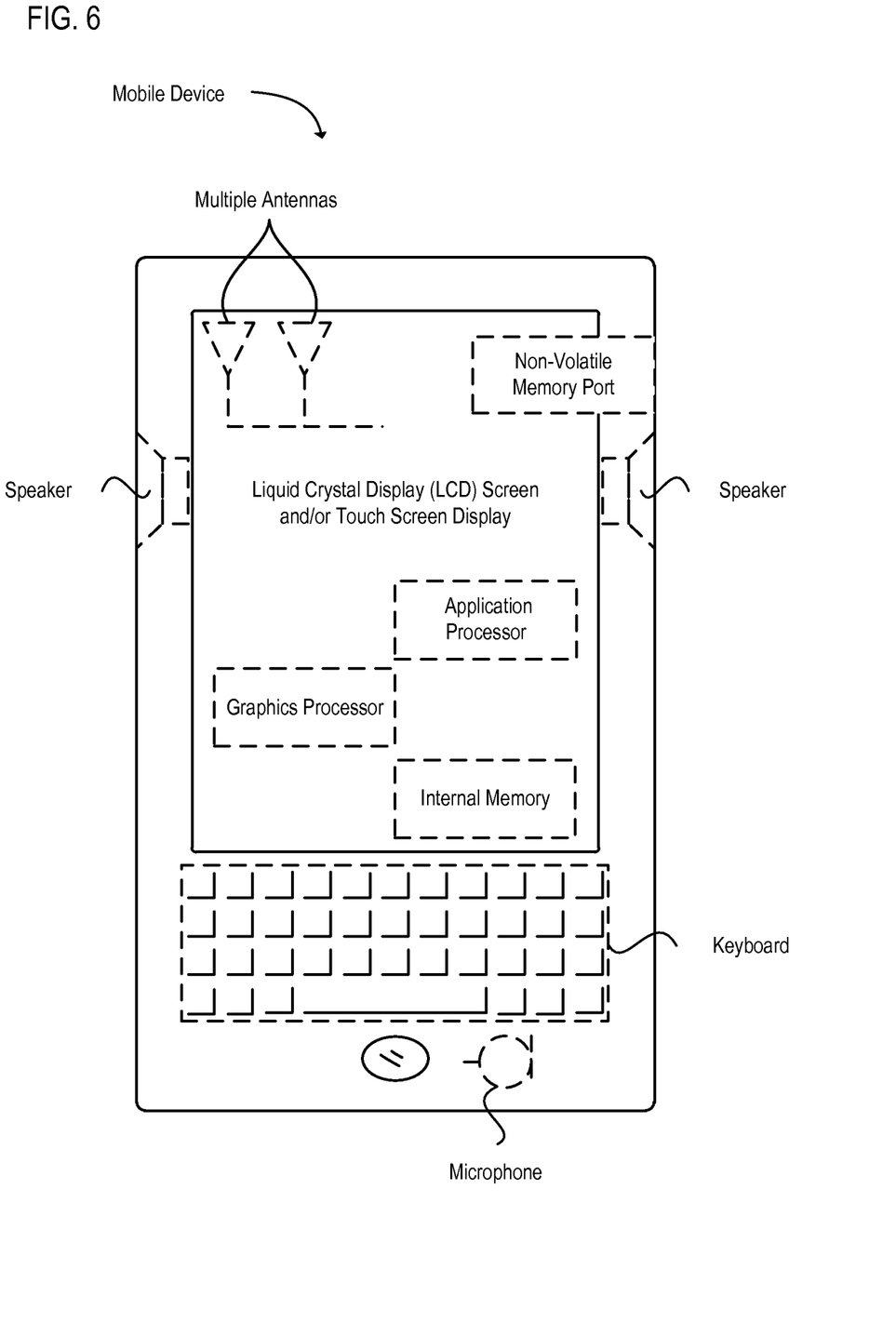
FIG. 6 is a schematic diagram of a UE able to receive dynamic assistance signaling for performing IC.

FIG. 6 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 6 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE configured to communicate with an eUTRAN. The UE includes a transceiver. The UE also includes a processor coupled to the transceiver. The processor is configured to receive a broadcast message including indications of transmission parameters for one or more UEs communicating with an interfering eNB. The processor is also configured to receive a signal including a transmission from a serving eNB. The transmission includes a PDSCH from the serving eNB. The processor is also configured to cancel PDSCH from the interfering eNB from the signal based on the transmission parameters. The indications of the transmission parameter are also signaled to the one or more UEs semi-statically and dynamically by the interfering eNB In Example 2, the processor of Example 1 is configured to receive additional transmission parameters for the one or more UEs communicating with the interfering eNB and/or parameters related to the interfering eNB via a dedicated RRC message.

In Example 3, the additional transmission parameters of any of Examples 1-2 include a set of cell identities related to transmission and/or reception points of potential cooperation.

In Example 4, the parameters related to the interfering eNB of any of Examples 1-3 include a cell-specific transmit power parameter.

In Example 5, the transmission parameters of any of Examples 1-4 include a modulation order, a PRB allocation, a PMI, an RI, an MCS, and a redundancy version. The modulation order is indicated by a compressed binary code.

In Example 6, the transmission parameters of any of Examples 1-5 include reference signal specific transmission parameters.

In Example 7, the processor of any of Examples 1-6 is configured to receive an indication from at least one of the interfering eNB and the serving eNB of whether the interfering eNB is transmitting transmission parameters.

In Example 8, the processor of any of Examples 1-7 is configured to receive an indication of RBs on which to communicate with the serving eNB. The RBs are restricted to a set of subbands smaller than all possible subbands.

In Example 9, the restricted set of subbands of any of Examples 1-8 are distributed over an entire available bandwidth.

In Example 10, the processor of any of Examples 1-9 is configured to cancel the PDSCH associated with the interfering eNB using symbol-level cancellation.

Example 11 is a method for receiving assistance signaling. The method includes communicatively coupling to a first base station. The method also includes receiving coupling parameters from a second base station. The coupling parameters indicate settings used by a wireless communication device when communicating with the second base station. The method also includes correcting communications from the first base station to remove interference from other communications according to the coupling parameters of the wireless communication device.

In Example 12, the method of Example 11 includes receiving higher level signaling indicative of additional coupling parameters.

In Example 13, receiving coupling parameters of any of Examples 11-12 includes receiving a power parameter specific to the wireless communication device.

In Example 14, receiving coupling parameters of any of Examples 11-13 includes receiving an indication of whether virtual resource block assignments are localized or distributed.

In Example 15, receiving coupling parameters of any of Examples 11-14 includes receiving an indication of a transmission scheme.

In Example 16, the method of any of Examples 11-15 includes receiving an indication from the second base station that the second base station will transmit coupling parameters.

In Example 17, the method of any of Examples 11-16 includes receiving a transmission schedule from the first base station. The transmission schedule includes fewer than all frequencies available for transmission.

Example 18 is a wireless communication device. The wireless communication device includes circuitry. The circuitry is configured to receive indications of communication settings for a plurality of time-frequency blocks. The indications are transmitted via lower level signaling. The circuitry is also configured to decode interfering communications using the communications settings. The circuitry is also configured to decode communications for the wireless communication device by canceling the interfering communications.

In Example 19, the indications of communication settings of Example 18 include an indication of total transmission layers.

In Example 20, the indications of communication settings of any of Examples 18-19 include an indication of a precoder for a base station reference signal.

In Example 21, the indications of communication settings of any of Examples 18-20 include an indication of a gap between time-frequency blocks.

In Example 22, the circuitry of any of Examples 18-21 is configured to receive a broadcast including an indication of whether communication settings are being transmitted.

In Example 23, the circuitry of any of Examples 18-22 is configured to receive a cell specific power parameter via a higher layer message.

Example 24 is a method for receiving assistance signaling. The method includes receiving a broadcast message including transmission parameters for a RB of a PDSCH associated with an interfering eNB. The method also includes receiving a signal including a transmission from a serving eNB. The transmission includes a PDSCH from the serving eNB. The method also includes canceling the PDSCH associated with the interfering eNB from the signal based on the transmission parameters.

In Example 25, the method of Example 24 includes receiving additional transmission parameters for the RB of the PDSCH associated with the interfering eNB via an RRC message.

In Example 26, the transmission parameters of any of Examples 24-25 include a modulation order. The modulation order is indicated by a compressed binary code.

In Example 27, the transmission parameters of any of Examples 24-26 include reference signal transmission parameters.

In Example 28, the method of any of Examples 24-27 includes receiving an indication from the interfering eNB of whether the interfering eNB is transmitting transmission parameters.

In Example 29, the method of any of Examples 24-28 includes receiving an indication of RBs in which to communicate with the serving eNB. The RBs are restricted to a set of subbands smaller than all possible subbands.

In Example 30, the restricted set of subbands of any of Examples 24-29 are distributed over an entire available bandwidth.

In Example 31, canceling the PDSCH associated with the interfering eNB of any of Examples 24-30 includes canceling the PDSCH associated with the interfering eNB using symbol-level cancelation.

In Example 32, the transmission parameters of any of Examples 24-31 include a power parameter.

In Example 33, the transmission parameters of any of Examples 24-32 include an indication of a transmission scheme.

In Example 34, the transmission parameters of any of Examples 24-33 include an indication of whether virtual resource block assignments are localized or distributed.

In Example 35, the transmission parameters of any of Examples 24-34 include an indication of total transmission layers.

In Example 36, the transmission parameters of any of Examples 24-35 include an indication of a precoder for a cell specific reference signal (CRS).

Example 37 is an apparatus including means to perform a method as described in any preceding example.

Example 38 is machine readable storage including machine-readable instructions, which when executed, implement a method or realize an apparatus as described in any preceding example.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. User equipment (UE) configured to communicate with an evolved universal terrestrial radio access network (eUTRAN), the UE comprising:
    a transceiver; and
    a processor coupled to the transceiver, the processor configured to:
        receive an indication from at least one of an interfering eUTRAN Node B (eNB) and a serving eNB of whether the interfering eNB is transmitting transmission parameters;
        receive a broadcast message comprising indications of transmission parameters for one or more UEs communicating with the interfering eNB;
        receive a signal including a transmission from the serving eNB, wherein the transmission comprises a physical downlink shared channel (PDSCH) from the serving eNB; and
        cancel PDSCH from the interfering eNB from the signal based on the transmission parameters,
    wherein the indications of the transmission parameter are also signaled to the one or more UEs semi-statically and dynamically by the interfering eNB, and
    wherein the indication of whether the interfering eNB is transmitting transmission parameters is received from a physical broadcast channel (PBCH), from the interfering eNB or the serving eNB, that includes a master information block having a bit that indicates whether the interfering eNB is transmitting transmission parameters, a PDSCH from the interfering eNB that includes a system information block having a bit that indicates whether the interfering eNB is transmitting transmission parameters, or the PDSCH from the serving eNB that includes a system information block having a bit that indicates whether the interfering eNB is transmitting transmission parameters.

2. The UE of claim 1, wherein the processor is further configured to receive additional transmission parameters for the one or more UEs communicating with the interfering eNB and/or parameters related to the interfering eNB via a dedicated Radio Resource Control (RRC) message.

3. The UE of claim 2, wherein the additional transmission parameters include a set of cell identities related to transmission and/or reception points of potential cooperation.

4. The UE of claim 2, wherein the parameters related to the interfering eNB include a cell-specific transmit power parameter.

5. The UE of claim 1, wherein the transmission parameters include a modulation order, a physical resource block (PRB) allocation, a precoding matrix indicator (PMI), a rank indicator (RI), a modulation and coding scheme (MCS), and a redundancy version, and wherein the modulation order is indicated by a compressed binary code.

6. The UE of claim 1, wherein the transmission parameters include reference signal specific transmission parameters.

7. The UE of claim 1, wherein the processor is configured to receive an indication of resource blocks (RBs) on which to communicate with the serving eNB, wherein the RBs are restricted to a set of subbands smaller than all possible subbands.

8. The UE of claim 7, wherein the restricted set of subbands are distributed over an entire available bandwidth.

9. The UE of claim 1, wherein the processor is configured to cancel the PDSCH associated with the interfering eNB using symbol-level cancellation.

* * * * *